United States Patent Office 3,738,802
Patented June 12, 1973

3,738,802
POLYAMIDE FIBERS DYED WITH THIADIAZOLYL AZO COMPOUNDS
Max A. Weaver and David J. Wallace, Kingsport, Tenn., assignors to Eastman Kodak Company, Rochester, N.Y.
No Drawing. Original application June 16, 1969, Ser. No. 833,745, now Patent No. 3,657,187. Divided and this application Jan. 6, 1972, Ser. No. 215,915
Int. Cl. C09b 29/36
U.S. Cl. 8—41 B                               9 Claims

ABSTRACT OF THE DISCLOSURE

Polyamide fibers are dyed bright, fast red to pink shades with a compound having the formula

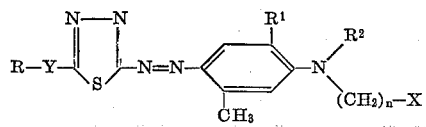

in which R is an alkyl, allyl, aryl, or cyclohexyl radical; Y is —O— or —S—; $R^1$ and $R^2$ each is hydrogen or alkyl; n is 2 or 3; and X is pyrrolidinono, acylamide, carbamoyl or acyloxy.

---

This is a divisional application of our application Ser. No. 833,745 filed June 16, 1969, now U.S. Pat. 3,657,187 for "Thiadiazolylazo Compounds and Polyamide Textile Materials Dyed Therewith."

This invention relates to certain novel, water-insoluble azo compounds, and more particularly, to novel 1,3,4-thiadiazolylazo dyes and to polyamide textile materials dyed therewith.

The novel compounds of the invention have the formula

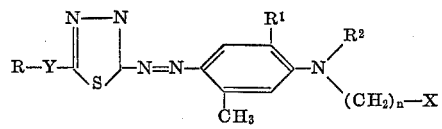

wherein

R is an alkyl, allyl, cycloalkyl, or aryl radical;
Y is —S— or —O—;
$R^1$ is hydrogen or lower alkyl;
$R^2$ is hydrogen or lower alkyl;
n is 2 or 3; and
X is hydrogen, pyrrolidinono, lower alkanoylamido, lower alkoxycarbonylamine, aroylamido, carbamoyl, lower alkanoyloxy, 2,2,4-tri-lower-alkyl-3-oxo-valeryloxy, or aroyloxy.

The novel azo compounds of the invention produce red to pink shades when applied to linear polyamide textile materials according to conventional dyeing procedures. The novel azo compounds possess a combination of desirable properties which renders them especially valuable as dyes for polyamide fibers. For example, the novel compounds exhibit excellent brightness and light-fastness on polyamide fibers. The azo compounds exhibit improved build-up and migration when applied to polyamide materials. These properties render the compounds of the invention superior to the azo compounds disclosed in U.S. Patent 3,096,320. The novel compounds are also more valuable for the dyeing of polyamide fibers than are those disclosed in French Patent 1,503,249 which relates primarily to azo compounds particularly suitable for dyeing cellulose acetate and polyester textile materials.

The lower alkyl radicals represented by R can be substituted or unsubstituted, branched- or straight-chain alkyl. Methyl, ethyl, propyl, isopropyl, butyl, isobutyl, etc. are typical unsubstituted alkyl groups represented by R. Typical groups which can be present on alkyl radical R include hydroxy, e.g. 2-hydroxyethyl, 3-hydroxypropyl; halogen, e.g. 2-chloroethyl, 3-bromopropyl; lower alkoxycarbonyl, e.g. 2-ethoxycarbonylethyl, 3-methoxycarbonylpropyl; lower alkanoyloxy, e.g. 2 - acetoxyethyl; lower alkoxy, e.g. 2-methoxyethyl; lower alkanoyl, e.g. 2-acetylethyl, aroyl, e.g. benzoylmethyl; cyano, e.g. 2-cyanoethyl; carbamoyl, e.g. 2-carbamoylethyl; dicarboximido, e.g. 3-succinimidopropyl; etc. As used herein to describe an alkyl moiety-containing group, "lower" designates a carbon content of up to about 4 carbon atoms. The alkyl radical represented by R can also be substituted with cycloalkyl, e.g. cyclopentyl, cyclohexyl, cycloheptyl, and lower alkyl-substituted derivatives thereof, and with aryl, e.g. phenyl and phenyl substituted with lower alkyl, lower alkoxy, or halogen. Cyclohexylmethyl, 2-cyclopentylethyl, 4 - ethylcyclohexylmethyl, 4-methoxycyclohexylmethyl, 2-(3-chlorohexyl)ethyl, benzyl, p-methylbenzyl, 2-p-ethoxyphenylethyl, 4-chlorobenzyl, 2-phenylethyl, etc. are illustrative of the cycloalkylalkyl and arylalkyl groups which R can represent. Examples of the cycloalkyl and aryl groups which R can represent are set forth hereinabove.

Methyl, ethyl, propyl, and butyl are representative of the lower alkyl groups which $R^1$ and $R^2$ can represent. Acetamido, propionamido, butyramido, acetoxy, propionoxy and butyroxy are typical alkanoylamido and alkanoyloxy group represented by X. Examples of the valeryloxy groups represented by X include 2,2,4-trimethyl-3-oxovaleryloxy and 2,2,4-triethyl-3-oxovaleryloxy. Examples of the alkoxycarbonylamino groups represented by X include methoxycarbonylamino, ethoxycarbonylamino, propoxycarbonylamino, and butoxycarbonylamino. The aryl moiety of the aroylamido and the aroyloxy groups represented by X can by phenyl or phenyl substituted, for example, with lower alkyl, lower alkoxy or halogen. 2-acetamidoethyl, 3 - propionamidopropyl, 2-butyroxyethyl, 3 - acetoxypropyl, 2 - (2,2,4-trimethyl-3-oxovaleryloxy) ethyl, 2 - (2 - pyrrolidinono)ethyl, 2-carbamoylethyl, 2-benzamidoethyl, 3-p-toloylamidopropyl, 2-p-chlorobenzoylethyl, 2-benzoyloxyethyl, etc. are specific examples of the groups which —$(CH_2)_n$—X can represent.

Unusually bright and light-fast shades of varying depths are produced on polyamide, e.g. nylon 66 and nylon 6, fibers, yarns and fabrics by the novel compounds of Formula I wherein R is methyl or ethyl, Y is —S—, $R^1$ is hydrogen or methyl, $R^2$ is hydrogen or lower alkyl, one of $R^1$ and $R^2$ is hydrogen, n is 2 or 3, and X is hydrogen, carbamoyl, lower alkanoylamido, lower alkanoyloxy, 2,2,4 - trimethyl-3-oxovaleryloxy, 2,2,4-triethyl-3-oxovaleryloxy, or lower alkoxycarbonylamino.

The novel azo compounds are prepared according to known procedures by diazotizing a compound having the formula (II)    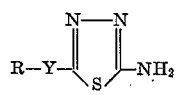

and coupling the diazonium salt with a coupler having the formula (III)

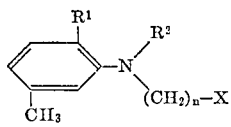

The couplers of Formula III are obtained by published procedures. The compounds of Formula II wherein Y is sulfur can be prepared according to conventional procedures by alkylating or arylating 2-amino-5-mercapto-1,3,4-thiadiazole (Ber. 28, 946, British Patent 726,045). The alkylation and arylation reactions, employing alkyl halides, alkyl sulfates, alkyl phosphates, aryl bromides or iodides, etc. can be carried out at elevated temperatures in a variety of solvents, e.g. water, alkanols, dimethylformamide, in the presence of a base such as potassium carbonate or sodium acetate. The compounds of Formula II wherein Y is oxygen can be synthesized by published techniques (J. Chem. Soc., 1967, 2700–2704).

The preparation of the novel compounds of the invention is further illustrated by the following examples.

EXAMPLE 1

Sodium nitrite (0.72 g.) is added portionwise to 5.0 ml. of conc. $H_2SO_4$ with stirring. The solution is cooled and 10 ml. of 1:5 acid (1 part propionic acid:5 parts acetic acid) is added below 15° C. After cooling, 2-amino-5-(ethylthio)-1,3,4-thiadiazole (1.61 g.) is added, followed by 10 ml. 1:5 acid, all below 5° C. The diazotization reaction is stirred and kept at 0–5° C. for 2 hr. and is then added to a chilled solution of N-(2-carbamoylethyl)-N-ethyl-m-toluidine (2.06 g.) dissolved in 40 ml. of 1:5 acid. The mixture is kept cold while ammonium acetate is added until the mixture is neutral to Congo Red test paper. After allowing to couple for 1 hr., the product is precipitated by the addition of water, collected by filtration, dried, and recrystallized from methanol. The product, 4-(5-ethylthio-1,3,4-thiadiazol-2-ylazo) - N - (2-carbamoylethyl)-N-ethyl-m-toluidine, melts at 180–182° C., produces bright pink shades of excellent light-fastness and build-up on nylon tricot and nylon carpet material.

The azo compounds disclosed in the table are prepared by diazotizing 0.01 mol of the appropriate aminothiadiazole and coupling the diazonium salt with 0.01 mol of the appropriate coupler according to the procedure described in Example 1. The azo compounds set forth in the examples of the table impart bright red to pink shades having excellent fastness to light on polyamide fibers. The compounds disclosed in the table conform to Formula I.

TABLE

| Ex. No. | R | Y | $R^1$ | $R^2$ | n | X |
|---|---|---|---|---|---|---|
| 2 | $C_6H_{11}$—(cyclohexyl) | S | H | —$C_2H_5$ | 2 | —NHCOCH$_3$ |
| 3 | $C_2H_5$— | S | H | —$C_2H_5$ | 2 | —OOCC(CH$_3$)$_2$COCH(CH$_3$)$_2$ |
| 4 | $CH_2$=CHCH$_2$— | S | H | —$C_2H_5$ | 2 | —NHCOCH$_3$ |
| 5 | $CH_3$— | S | H | —$C_2H_5$ | 2 | —OOC$C_6H_5$ |
| 6 | $C_2H_5$— | S | H | —$C_2H_5$ | 2 | —OOCCH$_3$ |
| 7 | $CH_3$— | S | H | —$C_2H_5$ | 3 | —NHCOC(CH$_3$)$_2$COCH(CH$_3$)$_2$ |
| 8 | $C_2H_5$— | S | H | —$C_2H_5$ | 2 | —NHCOCH$_3$ |
| 9 | $C_2H_5$— | O | H | —$C_2H_5$ | 3 | —NHCOCH$_3$ |
| 10 | $C_2H_5$— | O | H | —$C_2H_5$ | 3 | —NHCOCH$_3$ |
| 11 | $C_2H_5$— | S | H | —$C_2H_5$ | 3 | —NHCOCH$_3$ |
| 12 | $C_2H_5$— | S | —CH$_3$ | —CH$_3$ | 2 | —NHCOCH$_3$ |
| 13 | $C_2H_5$— | S | H | —CH$_3$ | 3 | —NHCOCH$_3$ |
| 14 | $C_2H_5$— | S | H | —CH$_2$CH(CH$_3$)$_2$ | 3 | —NHCOCH$_3$ |
| 15 | $C_2H_5$— | S | H | —CH(CH$_3$)CH$_2$CH$_3$ | 2 | —NHCOCH$_3$ |
| 16 | $C_2H_5$— | S | H | —$C_2H_5$ | 2 | —NHCOC$_6H_5$ |
| 17 | $CH_3CH(CH_3)CH_2$— | S | H | —$C_2H_5$ | 2 | —NHCOC$_6H_5$ |
| 18 | $CH_3CH(CH_3)CH_2$— | O | H | —$C_2H_5$ | 3 | —NHCOC$_6H_5$ |
| 19 | —$C_2H_5$ | O | H | —$C_2H_5$ | 2 | —NHCOCH$_2$CH$_3$ |
| 20 | —$C_2H_5$ | S | H | —$C_2H_5$ | 2 | —NHCOCH$_2$CH$_3$ |
| 21 | $CH_3(CH_2)_3$— | S | H | —(CH$_2$)$_2$CH$_3$ | 2 | —NHCOC$_6H_4$-p-OCH$_3$ |
| 22 | $CH_3(CH_2)_3$— | S | H | —(CH$_2$)$_2$CH$_3$ | 2 | —NHCOC$_6H_4$-p-CH$_3$ |
| 23 | $CH_3(CH_2)_3$— | S | H | —$C_2H_5$ | 2 | —NHCOC$_6H_4$-p-Cl |
| 24 | $CH_3(CH_2)_3$— | O | H | —$C_2H_5$ | 2 | —NHCOC$_6H_4$-p-Cl |
| 25 | $(CH_3)_2CHCH_2$— | O | H | —$C_2H_5$ | 2 | —CONH$_2$ |
| 26 | $(CH_3)_2CHCH_2$— | S | H | —$C_2H_5$ | 2 | —CONH$_2$ |
| 27 | $CH_2$=CHCH$_2$— | S | H | —$C_2H_5$ | 2 | —CONH$_2$ |
| 28 | $CH_2$=CHCH$_2$— | S | H | —$C_2H_5$ | 2 | —NHCOCH$_2$CH$_2$CH$_3$ |
| 29 | $CH_2$=CHCH$_2$— | S | H | —$C_2H_5$ | 3 | —NHCOCH$_3$ |
| 30 | $CH_2$=CHCH$_2$— | O | H | —$C_2H_5$ | 3 | —NHCOCH$_3$ |
| 31 | $C_6H_{11}$— | O | H | —$C_2H_5$ | 2 | —CONH$_2$ |
| 32 | $C_6H_{11}$— | S | H | —$C_2H_5$ | 2 | —CONH$_2$ |
| 33 | $C_2H_5$— | S | H | —$C_2H_5$ | 2 | —NCOCH$_2$CH$_2$CH |
| 34 | $CH_3$— | S | H | —$C_2H_5$ | 2 | —NHCOCH$_3$ |
| 35 | $CH_3$— | S | H | —$C_2H_5$ | 2 | —CONH$_2$ |
| 36 | $CH_3$— | S | H | —$C_2H_5$ | 2 | —OOCCH$_3$ |
| 37 | $CH_3$— | S | H | —$C_2H_5$ | 2 | —CONH$_2$ |
| 38 | $C_2H_5$— | S | H | —$C_2H_5$ | 2 | —NHCOOC$_2H_5$ |
| 39 | $HOCH_2CH_2$— | S | H | —$C_2H_5$ | 2 | —NHCOCH$_3$ |
| 40 | $HOCH_2CH_2$— | S | H | —$C_2H_5$ | 2 | —CONH$_2$ |
| 41 | $HOCH_2CH_2$ | O | H | —$C_2H_5$ | 2 | —CONH$_2$ |
| 42 | $ClCH_2CH_2$— | S | H | —$C_2H_5$ | 2 | —CONH$_2$ |
| 43 | $CH_3OOCCH_2CH_2$— | S | H | —$C_2H_5$ | 2 | —CONH$_2$ |
| 44 | $CH_3COOCH_2CH_2$— | S | H | —$C_2H_5$ | 2 | —CONH$_2$ |
| 45 | $CH_3COOCH_2CH_2$— | O | H | —$C_2H_5$ | 2 | —CONH$_2$ |
| 46 | $C_6H_5CH_2$— | O | H | —$C_2H_5$ | 2 | —NHCOCH$_3$ |
| 47 | $C_6H_5CH_2$— | S | H | —$C_2H_5$ | 3 | —NHCOCH$_3$ |
| 48 | $CH_3O$-p-$C_6H_4CH_2$— | S | H | —$C_2H_5$ | 2 | —NHCOOC$_2H_5$ |
| 49 | $CH_3$-p-$C_6H_4CH_2$— | S | H | —$C_2H_5$ | 2 | —NHCOOCH$_3$ |
| 50 | 4-$CH_3$-cyclohexyl—$CH_2$— | S | H | —$C_2H_5$ | 2 | —OOCCH(CH$_3$)$_2$ |
| 51 | 4-$CH_3$-cyclohexyl—$CH_2$— | S | H | —$C_2H_5$ | 2 | —NHCOCH$_3$ |
| 52 | $CH_3COCH_2CH_2$— | S | H | —$C_2H_5$ | 2 | —NHCOCH$_3$ |
| 53 | $CH_3COCH_2CH_2$— | S | H | —$C_2H_5$ | 2 | —CONH$_2$ |
| 54 | $CH_3COCH_2CH_2$— | O | H | —$C_2H_5$ | 2 | —CONH$_2$ |
| 55 | $C_6H_5CH_2CH_2$— | O | H | —$C_2H_5$ | 2 | —CONH$_2$ |
| 56 | $C_6H_5CH_2CH_2$— | S | H | —$C_2H_5$ | 2 | —CONH$_2$ |
| 57 | $C_6H_5CH_2CH_2$— | S | H | —$C_2H_5$ | 3 | —NHCOC$_6H_5$ |
| 58 | $C_6H_5COCH_2$— | S | H | —$C_2H_5$ | 3 | —NHCOC(CH$_3$)$_2$COCH(CH$_3$)$_2$ |
| 59 | NCCH$_2$CH$_2$— | S | H | —$C_2H_5$ | 2 | —OOCC$_6H_4$-p-CH$_3$ |
| 60 | $H_2$NCOCH$_2$CH$_2$— | S | H | —$C_2H_5$ | 2 | —NHCOCH$_3$ |
| 61 | COCH$_2$CH$_2$CONHCH$_2$CH$_2$— | S | H | —$C_2H_5$ | 2 | —NHCOCH$_3$ |
| 62 | $C_6H_5$— | S | —CH$_3$ | H | 2 | —NHCOCH$_3$ |
| 63 | $C_6H_5$— | O | —CH$_3$ | H | 2 | —NHCOCH$_3$ |
| 64 | $CH_3$-p-$C_6H_4$— | S | —CH$_3$ | H | 3 | —NHCOCH$_3$ |

The novel azo compounds can be applied to polyamide textile materials according to known disperse dyeing techniques. Various dispersing and wetting agents can be employed in the dispersion of the finely divided dye compound in an essentially aqueous dyebath. Procedures by which the compounds of the invention can be applied to polyamide textile materials are described in U.S. Pats. 3,100,134 and 3,320,021. The following example illustrates a method for applying the novel compounds to polyamide fibers.

EXAMPLE 64

The azo compound (50.0 mg.) of Example 6 is dispersed in 5 cc. of 2-methoxyethanol. A small amount (3–5 cc.) of a 3% sodium lignin sulfonate solution is added, with stirring, and then the volume of the bath is brought to 150 cc. with water. A 5 g. textile fabric made of nylon 66 fibers is placed in the bath which is then slowly brought to the boil. The dyeing is carried out at the boil for one hour with occasional stirring. The dyed fabric is then removed from the dyebath, rinsed with water, and dried in an oven at 250° F. The fabric is dyed a bright shade of pink exhibiting excellent fastness properties when tested in accordance with the procedures described in the Technical Manual of the American Association of Textile Chemists and Colorists, 1968 edition.

The polyamide materials which can be dyed with the novel azo compounds are well-known and include nylon 66 (polyhexamethylene adipamide) manufactured by the polymerization of adipic acid and hexamethylenediamine, nylon 6 (polycaprolactam) prepared from epsilon-aminocaproic acid lactam (caprolactam), and nylon 8. A detailed description of the synthetic polyamide materials which are dyed bright, fast shades by the compounds of the invention is set forth in U.S. Pat. 3,100,134.

The invention has been described in detail with particular reference to preferred embodiments thereof, but it will be understood that variations and modifications can be effected within the spirit and scope of the invention.

We claim:

1. A fiber having a basis of a linear synthetic polyamide dyed with a compound having the formula

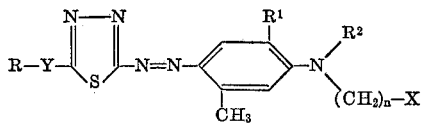

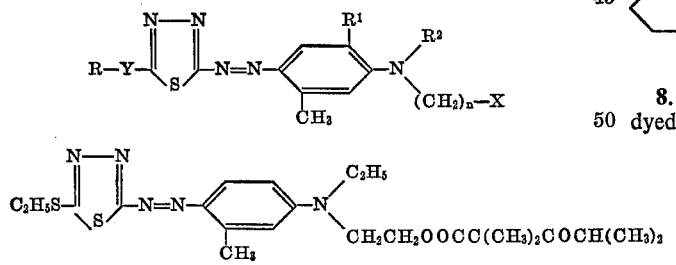

wherein
R is lower alkyl; lower alkyl substituted with hydroxy, halogen, lower alkoxy, succinimido, cyclohexyl, lower alkylcyclohexyl, or aryl; allyl; cyclohexyl; cyclohexyl substituted with lower alkyl; or aryl;
Y is —S— or —O—;
$R^1$ and $R^2$ each is hydrogen or lower alkyl, one of $R^1$ and $R^2$ being hydrogen;
$n$ is 2 or 3; and
X is pyrrolidinono, lower alkanoylamido, lower alkoxycarbonylamino, aroylamido, carbamoyl, lower alkanoyloxy, 2,2,4-tri-lower-alkyl - 3 - oxovaleryloxy, or aroyloxy;
in which each aryl is phenyl or phenyl substituted with lower alkyl, lower alkoxy or halogen.

2. A fiber according to claim 1 wherein the polyamide is poly(hexamethylene adipamide) or poly(caprolactam).

3. A fiber according to claim 2 wherein the fiber is dyed with a compound having the formula

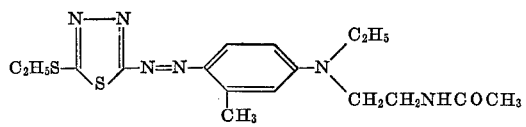

wherein R is methyl or ethyl; Y is —S—; $R^1$ is hydrogen or methyl; $R^2$ is hydrogen or lower alkyl; one of $R^1$ and $R^2$ is hydrogen; $n$ is 2; and X is carbamoyl, lower alkanoylamido, lower alkanoyloxy, 2,2,4-trimethyl-3-oxovaleryloxy, 2,2,4-triethylvaleryloxy or lower alkoxycarbonylamino.

4. A fiber according to claim 2 wherein the fiber is dyed with a compound having the formula

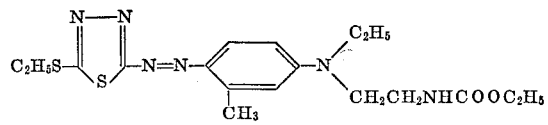

5. A fiber according to claim 2 wherein the fiber is dyed with a compound having the formula

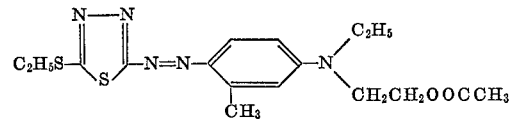

6. A fiber according to claim 2 wherein the fiber is dyed with a compound having the formula

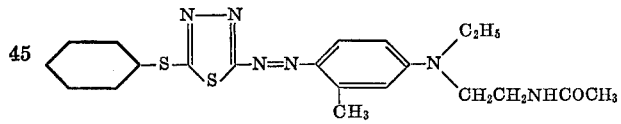

7. A fiber according to claim 2 wherein the fiber is dyed with a compound having the formula

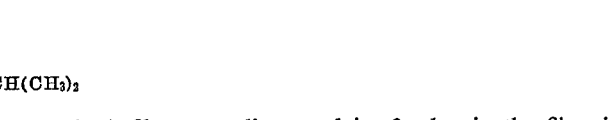

8. A fiber according to claim 2 wherein the fiber is dyed with a compound having the formula 9. A fiber according to claim 2 wherein the fiber is dyed with a compound having the formula

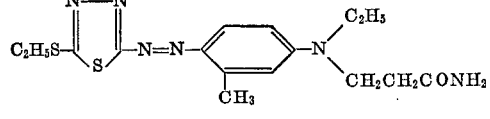

References Cited

UNITED STATES PATENTS 3,221,006   11/1965   Moore et al. _____ 260—158

FOREIGN PATENTS 1,503,249   10/1967   France _____ 260—158

GEORGE F. LESMES, Primary Examiner

P. C. IVES, Assistant Examiner